United States Patent
Hill et al.

(10) Patent No.: US 6,359,051 B1
(45) Date of Patent: *Mar. 19, 2002

(54) MAGNETIC THERMOPLASTIC TUBING

(75) Inventors: Valerie Anne Hill, Akron; Michael Gozdiff, North Canton, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,174

(22) Filed: Dec. 14, 1999

(51) Int. Cl.⁷ .................................................. C08K 3/18
(52) U.S. Cl. ...................... 524/431; 524/435; 524/523; 524/157
(58) Field of Search ................................. 524/431, 435, 524/478.1, 523, 511, 156, 157, 167, 400

(56) References Cited

U.S. PATENT DOCUMENTS

| | | | |
|---|---|---|---|
| 4,234,378 A | * 11/1980 | Iwasaki et al. | 162/138 |
| 4,562,019 A | * 12/1985 | Inoue | 264/24 |
| 5,674,933 A | * 10/1997 | Ngoc et al. | 524/504 |
| 5,990,218 A | * 11/1999 | Hill et al. | 524/431 |

* cited by examiner

*Primary Examiner*—Edward J. Cain
*Assistant Examiner*—Kat Wyrozebski
(74) *Attorney, Agent, or Firm*—Alvin T. Rockhill

(57) ABSTRACT

This invention discloses a polymeric magnet composition that is particularly useful for extrusion into thermoplastic magnetic tubing, said polymeric magnet composition being comprised of (1) from 2 to 8 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates and (g) a crosslinking agent; (2) from 2 to 8 parts by weight of a styrene-butadiene resin; (3) from 80 to 90 parts by weight of a magnetic powder; and (4) from 1 to 8 parts by weight of an internal lubricant.

9 Claims, No Drawings

MAGNETIC THERMOPLASTIC TUBING

BACKGROUND OF THE INVENTION

Rubbery or semi-flexible magnetic compositions are used in a wide variety of applications. For instance, such materials are widely used as a combination airtight gasket and magnetic closure for refrigerator and freezer doors. They are also used in decorative magnets that will stick to a wide variety of metal (steel) objects, such as oven or refrigerator doors. In any case, such semiflexible or rubbery magnets are typically comprised of a blend of a rubbery polymer and a magnetic powder that is formed into the desired shape and then cured. Such rubbery magnetic compositions also typically lack heat, ultraviolet light and outdoor weather resistance.

Heat and light stabilizers can be employed to improve the heat and ultraviolet light aging characteristics of conventional blends of rubber with magnetic powder. However, the degree to which the aging characteristics of such blends can be improved by the addition of additives is limited. In fact, there is a demand for performance characteristics in such applications that has not heretofore been realized by the utilization of heat and light stabilizers. For instance, it would be highly desirable for rubbery magnets used in refrigerator and freezer doors to have a higher level of resistance to discoloration and cracking under conditions of heat and exposure to ultraviolet light experienced throughout the life of the refrigerator or freezer. Resistance to ultraviolet light is particularly important in out door applications, such as automotive seals and seals for metal framed doors and windows.

U.S. Pat. No. 5,674,933 and U.S. Pat. No. 5,767,173 disclose a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates and (g) a crosslinking agent. U.S. Pat. No. 5,380,785 discloses a similar type of rubbery polymer and U.S. Pat. No. 5,616,651 discloses a technique for making a low odor version of the rubbery polymer by adding an aminoalcohol to the emulsion thereof.

U.S. Pat. No. 5,990,218 discloses a polymeric magnet composition which is comprised of (1) from 5 to 19 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates and (g) a crosslinking agent; (2) from 80 to 90 parts by weight of a magnetic powder; and (3) from 1 to 10 parts by weight of a internal lubricant. These magnetic compositions provide a higher level of resistance to heat and ultraviolet light than those made utilizing conventional blends of rubber and magnet powder. They also offer the advantage of being capable of being injection-molded into the desired form without the need for a curing step.

SUMMARY OF THE INVENTION

The present invention relates to a polymeric composition having ultraviolet light and heat resistance that can be extruded into tubing that can be magnetized. The tubing can optionally be cut or chopped into gaskets or washers that can be magnetized. For instance, the tubing can be cut to the desired length and used as solenoid assemblies in automotive door lock systems. These polymeric magnetic compositions offer the advantage of being thermoplastic materials rather than thermosets. By virtue of being thermoplastics, they can be extruded into the desired form without the need for a curing step. Thus, rubbery magnetic tubing can be manufactured by a simpler, less costly process by utilizing the compositions of this invention. Additionally, because the material is a thermoplastic rather than a thermoset, scrap and defective product can easily recycled.

This invention more specifically discloses a polymeric magnet composition that is particularly useful for extrusion into thermoplastic magnetic tubing, said polymeric magnet composition being comprised of (1) from 2 to 8 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of sulfonates and sulfate derivatives, (o a dispersant selected from the group consisting of aromatic formaldehyde condensation products and polycarboxylates and (g) a crosslinking agent; (2) from 2 to 8 parts by weight of a styrene-butadiene resin; (3) from 80 to 90 parts by weight of a magnetic powder; and (4) from 1 to 8 parts by weight of an internal lubricant. The magnetic compositions of this invention provide a higher level of resistance to heat and ultraviolet light than those made utilizing conventional blends of rubber and magnet powder. They also offer the advantage of being capable of being extruded into tubing of the desired form without the need for a curing step.

The present invention also discloses a process for producing thermoplastic magnetic tubing which comprises extruding a polymeric composition into the said thermoplastic magnetic tubing, wherein said polymeric composition is comprised of (1) from 2 to 8 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates and (g) a crosslinking agent; (2) from 2 to 8 parts by weight of a styrene-butadiene resin; (3) from 80 to 90 parts by weight of a magnetic powder; and (4) from 1 to 8 parts by weight of an internal lubricant.

DETAILED DESCRIPTION OF THE INVENTION

The rubbery polymers of this invention are synthesized utilizing a free radical emulsion polymerization technique, such as the technique described in U.S. Pat. No. 5,380,785, U.S. Pat. No. 5,616,651, U.S. Pat. No. 5,674,933 or U.S. Pat. No. 5,767,173. The teachings of U.S. Pat. No. 5,380,785, U.S. Pat. No. 5,616,651, U.S. Pat. No. 5,674,933 and U.S. Pat. No. 5,767,173 are incorporated herein by reference in their entirety. Rubbery polymers of this type are sold by The Goodyear Tire & Rubber Company as Sunigum® rubber. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, and (e) a crosslinking agent. The crosslinking agent is typically a multi-functional acrylate, a multi-functional methacrylate or divinylbenzene. Some specific examples of crosslinking agents that can be used include ethylene glycol methacrylate, divinylbenzene and 1,4-butanediol dimethacrylate.

Technically, the rubbery polymers used in the magnet compositions of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, and (e) a crosslinking agent. These repeat units differ from the monomers that they were derived from in that they contain one less carbon-to-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units that are derived from those monomers.

The rubbery polymers used in the magnet compositions of this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene, and (e) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene, and (e) from about 0.5 weight percent to about 4 weight percent of a crosslinking agent.

The rubbery polymers used in the magnet compositions of this invention will more preferably be comprised of repeat units which are derived (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene, and (e) from about 1 weight percent to about 3 weight percent of a crosslinking agent. The percentages reported in this paragraph are based upon the total weight of the rubbery polymer.

The rubbery polymers used in the magnet compositions of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent, a surfactant selected from the group consisting of sulfonates and sulfate derivatives and a dispersant selected from the group consisting of aromatic formaldehyde condensation products and polycarboxylates. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations will typically contain from about 0.1 phm (parts per hundred parts of monomer by weight) to about 5 phm of at least one member selected from the group consisting of metal salts of alkyl sulfates and metal salts of alkyl sulfonates and from about 0.1 phm to about 5 phm of at least one dispersant selected from the group consisting of aromatic formaldehyde condensation products and polycarboxylates. It is generally preferred for the reaction mixture to contain from about 0.25 phm to about 4.25 phm of the metal salt of the alkyl sulfonate or the metal salt of the alkyl sulfate and from about 0.25 phm to about 4.25 phm of the dispersant selected from the group consisting of aromatic formaldehyde condensation products and polycarboxylates. It is normally more preferred for the reaction mixture to contain from about 0.4 phm to about 3.5 phm of the metal salt of the alkyl sulfonate or the metal salt of the alkyl sulfate and from about 0.4 phm to about 3.5 phm of the dispersant selected from the group consisting of aromatic formaldehyde condensation products and polycarboxylates.

The free radical polymerization technique utilized in the synthesis of the rubbery polymer is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds, such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds, such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like; and the various alkyl perketals, such as 2,2-bis-(t-butyl-peroxy)butane, and the like. Water-soluble peroxygen-free radical initiators are especially useful in such aqueous polymerizations.

The emulsion polymerization used in the synthesis of the rubbery polymer is typically carried out at the temperature ranging between about 60° F. (20° C.) and 190° F. (88° C.).

At temperatures above about 88° C., alkyl acrylate monomers, such as butyl acrylate, have a tendency to boil. Thus, a pressurized jacket would be required for heating such alkyl acrylate monomers to temperatures in excess of about 88° C. On the other hand, at polymerization temperatures of less than about 55° C., a redox initiator system is required to insure satisfactory polymerization rates.

The sulfonates and sulfate derivatives that are useful as surfactants are commercially available from a wide variety of sources. For instance, Dupont sells sodium alkylarylsulfonate under the tradename Alkanol®, Browning Chemical Corporation sells sodium dodecylbenzene sulfonates under the tradename Ufaryl® D1-85 and Ruetgers-Nease Chemical Company sells sodium cumene sulfonate under the tradename Naxonate Hydrotrope®. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

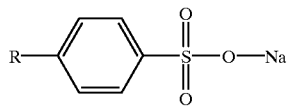

wherein R represents an alkyl group containing from 1 to about 20 carbon atoms. It is preferred for the alkyl group to contain from about 8 to about 14 carbon atoms.

The sulfonate surfactant can be a mixture of (mono) dialkylate ether disulfonates. The advantage of the disulfonate structure is that it contains two ionic charges per molecule instead of one as is the case with conventional alkyl sulfonate surfactants. Mixtures of (mono)dialkylate ether disulfates which are useful in the practice of this invention are commercially available from a wide variety of sources. For instance, Dow Chemical sells Dowfax® alkylated disulfonated diphenyl oxides which are of the structural formula:

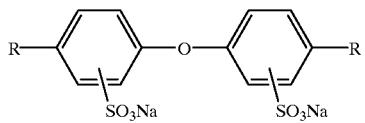

wherein R is an alkyl group which is typically —$C_6H_{13}$, —$C_{10}H_{21}$, —$C_{12}H_{25}$ or —$C_{16}H_{33}$. Sodium mono- and di-dodecyldiphenyloxide disulfonates are sold by American Cyanamid as DPOS-45 surfactants. Alpha-olefin sulfonate surfactants which are suitable for utilization in this invention are commercially available from Witco and Hoechst AG.

The sulfate surfactants which are useful include metal salts of alkylsulfates having the structural formula $ROSO_3X$ and metal salts of alkylethersulfates having the structural formula $RO(CH_2CH_2O)_nSO_3X$, wherein X represents a group Ia metal, such as sodium or potassium. Sodium lauryl sulfate, sodium ethanolamine lauryl sulfate and triethanolamine lauryl sulfate are representative examples of commercially available sulfate surfactants.

The dispersants utilized in the polymerization are normally either aromatic formaldehyde condensation products or polycarboxylates. The aromatic formaldehyde condensation products are normally polysulfonates which are the reaction product of aromatic compounds and formaldehyde. Such aromatic formaldehyde condensation product soaps can be made by a relatively simple process. For example, in such a process, 200 parts of naphthalene is reacted with 200 parts of 98 percent sulfuric acid for 5 hours at a temperature of about 165°. The solution made is then subsequently cooled and diluted with 90 parts of water. Then, 107 parts of a 30 percent formaldehyde solution is added and the mixture is stirred for 20 hours at a temperature of about 80° C. Toward the end of this reaction period, the mixture is gradually heated to 100° C. Neutralization is subsequently carried out at 20° C. to 25° C. with about 165 to 180 parts of a 25 percent ammonia solution. The neutralization product is then filtered and, if necessary, dried in a vacuum drier.

Numerous variations of this synthesis are possible, and a wide range of aromatic compounds and their derivatives can react with aldehydes, ketones and compounds that eliminate aldehyde groups. For example, (a) dispersants produced by condensation of aromatic sulfonic acids and benzyl chloride or benzoin; (b) dispersants produced by condensation of various alkylarylsulfonic acids with a halogen arylsulfonic acid; and (c) dispersants produced by condensation of sulfonated phenols or 2-naphthols with formaldehyde and various nitrogen compounds.

The free radical emulsion polymerization utilized in synthesizing the rubbery polymer is typically conducted at a temperature which is within the range of about 10° C. to about 95° C. In most cases, the polymerization temperature utilized will vary between about 20° C. and about 80° C. The polymerization is carried out as a two-step batch process. In the first step, a seed polymer containing latex is synthesized. This is done by polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40 percent 2-ethylhexyl acrylate, from about 5 to about 35 weight percent methyl methacrylate, ethyl methacrylate, methyl acrylate or ethyl acrylate, from about 2 to about 30 weight percent acrylonitrile and from about 0.25 weight percent to 6 weight percent of the crosslinking agent. It is typically preferred for the monomeric component utilized in the first step to include about 50 weight percent to about 85 weight percent butyl acrylate, or optionally a mixture of butyl acrylate and 2-ethylhexyl acrylate containing up to about 40 percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile and from about 0.5 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40 percent 2-ethylhexyl acrylate, from about 5 weight percent to about 25 weight percent methyl methacrylate, ethyl methacrylate, methyl acrylate or ethyl acrylate, from about 5 weight percent to about 25 weight percent acrylonitrile and from about 1 to about 3 weight percent crosslinking agent.

After the seed polymer latex has been prepared, styrene monomer, additional acrylonitrile monomer and additional crosslinking agent is added to the seed polymer containing latex. As a general rule, from about 4 parts by weight to about 30 parts by weight of styrene, from about 1 part by weight to about 20 parts by weight of additional acrylonitrile and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile and from about 0.05 parts by weight to 1 part by weight of the crosslinking agent. It is typically more preferred for about 10 parts by weight to about 17 parts by weight of styrene, about 4 parts by weight to about 8 parts by weight of acrylonitrile and about 0.1 parts by weight to about 0.5 parts by weight of the crosslinking agent to be added to the seed polymer latex to initiate the second phase of the polymerization.

A wide variety of crosslinking agents can be utilized in carrying out the polymerizations used in the synthesis of the rubbery polymer. Some representative examples of crosslinking agents which can be utilized include difunctional acrylates, difunctional methacrylates, trifunctional acrylates, trifunctional methacrylates and divinylbenzene. A crosslinking agent that has proven to be particularly useful is 1,4-butanediol dimethacrylate.

In most cases, the polymerization will be continued until a high monomer conversion has been attained. After the polymerization has been completed, it is normally desirable to add an aminoalcohol to the emulsion to deodorize the latex. The aminoalcohol will generally be of the structural formula HO—A—$NH_2$, wherein A represents an alkylene group which contains from 2 to about 20 carbon atoms. It is normally preferred for the aminoalcohol to contain from 2 to about 10 carbon atoms with amino alcohols which contain from 2 to about 5 carbon atoms being most preferred. Ethanolamine (HO—$CH_2$—$CH_2$—$NH_2$) which is also known as 2-aminoethanol and 2-hydroxyethylamine is a representative example of a highly preferred aminoalcohol. Some additional examples of preferred aminoalcohols include 3-aminopropanol, 4-aminobutanol, 2-amino-2-methyl-1-propanol, 2-amino-2-ethyl-1,3-propanediol, N-methyl-2,2-iminoethanol and 5-aminopentanol.

This deodorizing step will be carried out under conditions which allow for the aminoalcohol to react with residual n-butylacrylate and acrylonitrile which is present in the emulsion. This reaction will proceed over a broad temperature range and the deodorizing step can be conducted at any temperature which is within the range of about 5° C. and about 95° C. However, for practical reasons, the deodorizing step will normally be carried out at a temperature which is within the range of about 20° C. to about 70° C. Since the reaction is faster at higher temperatures, the amount of reaction time needed will decrease with increasing temperature. For instance, at a temperature of about 20° C., a residence time in the deodorizing step of one to three days may be required. On the other hand, at a temperature of about 65° C., only about two hours of reaction time is normally required.

The amount of time required for the aminoalcohol to react with the residual n-butylacrylate monomer and residual acrylonitrile monomer will also depend upon the level of aminoalcohol utilized. As a general rule, from about 0.05 weight percent to about 2 weight percent of the aminoalcohol will be added, based upon the total weight of the emulsion. More typically, from about 0.1 weight percent to about 1.5 weight percent of the aminoalcohol will be added. It is normally preferred to utilize from about 0.3 weight percent to about 1 weight percent of the aminoalcohol.

The rubbery polymer made by the two-step batch polymerization process is recovered from the emulsion (latex) after the optional deodorizing step. This can be accomplished by utilizing standard coagulation techniques. For instance, coagulation can be accomplished by the addition of salts, acids or both to the latex.

After the rubbery polymer is recovered by coagulation, it can be washed to further reduce odors. This can be accomplished by simply pouring or spraying water on the rubbery polymer. The rubbery polymer can also be washed by putting it in a water bath which will further reduce odor. After being washed, the rubbery polymer is generally dried.

It is sometimes advantageous to convert the dry rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride and silica. Calcium carbonate is a highly desirable partitioning agent that can be utilized in such applications.

The rubbery polymer is then blended with a styrene-butadiene resin, a magnet powder, and an internal lubricant to make the magnet compositions of this invention. These blends can be prepared by blending the rubbery polymer, the styrene-butadiene resin, the magnet powder, and the internal lubricant utilizing standard mixing techniques. It is highly preferred for the rubbery polymer to be in powdered form when blended with the styrene-butadiene resin, the magnet powder and the internal lubricant to make the rubbery magnet compositions of this invention.

The magnetic compositions of this invention will typically contain from about 2 parts by weight to about 8 parts by weight of the rubbery polymer, from about 2 parts by weight to about 8 parts by weight of the styrene-butadiene resin, from about 80 parts by weight to about 90 parts by weight of the magnetic powder, and from about 1 part by weight to about 10 parts by weight of the internal lubricant. The magnetic compositions of this invention will preferably contain from about 3 parts by weight to about 6 parts by weight of the rubbery polymer, from about 3 parts by weight to about 6 parts by weight of the styrene-butadiene resin, from about 85 parts by weight to about 89 parts by weight of the magnetic powder, and from about 2 parts by weight to about 8 parts by weight of the internal lubricant. The magnetic compositions of this invention will most preferably contain from about 3 parts by weight to about 5 parts by weight of the rubbery polymer, from about 3 parts by weight to about 5 parts by weight of the styrene-butadiene resin, from about 87 parts by weight to about 88 parts by weight of the magnetic powder and from about 3 parts by weight to about 6 parts by weight of the internal lubricant. Various colorants and/or pigments can also be added to the composition to attain a desired color.

The magnet powder can be selected from a wide variety of iron, nickel and cobalt compounds that have ferromagnetic capacity. For instance, most of the ferrites of the general formula MeO:$Fe_2O_3$, in which Me is a metal, can be used as the magnet powder. Barium ferrite, $BaO:6Fe_2O_3$, is a variation of the basic magnetic iron-oxide magnetite which has a hexagonal crystalline form and is very useful as the magnet powder. Powdered barium ferrite can be magnetically aligned and then compacted and sintered. It also has a very high uniaxial magnetic anisotropy capable of producing high values of coercive force (Hc). For a permanent magnet to retain its magnetization without loss over a long period of time, the coercive force should be as high as possible. Powdered strontium ferrite is also useful as the magnet powder. Alloys of nickel and iron, known as permalloy, have a maximum saturation magnetization in cases where the alloy contains about 50 percent nickel and 50 percent iron and are useful in powdered form as the magnet powder. The magnet powder will typically have a particle size that is within the range of about 0.1 to about 10 microns. The magnet powder will more typically have a particle size that is within the range of about 1 to about 5 microns.

The styrene-butadiene resin will typically have a bound styrene content of at least about 55 weight percent (a bound butadiene content of no more than about 45 weight percent). The styrene-butadiene resin will more typically have a bound styrene content that is within the range of about 60 weight percent to about 90 weight percent. The styrene-butadiene resin will preferably have a bound styrene content that is within the range of about 75 weight percent to about 85 weight percent. Pliolite® S-6B reinforcing resin which is commercially available from The Goodyear Tire & Rubber Company is an example of a styrene-butadiene resin that can be utilized in the polymeric compositions of this invention. Pliolite® S-6B resin has a bound styrene content of 82.5 weight percent, a bound butadiene content of 17.5 weight percent, a specific gravity of 1.04, and a softening point of 47±5° C. It is contemplated that other resinous materials, such as polyamide resins or phenolformaldehyde resins, can also be used.

The internal lubricant can be any of a wide variety of materials. For instance, the internal lubricant can be a non-polymeric or a polymeric processing aid. Some representative examples of internal lubricants that can be used include paraffin wax, stearic acid, a metal salt of stearic acid, polyethylene glycol, polypropylene glycol, low molecular weight polyethylene, amorphous polypropylene, a processing oil, a phthalate-ester plasticizer, epoxidized soy oil and ethylene vinyl acetate or an ethylene methacrylate. Low molecular weight polyethylene is highly preferred as the internal lubricant.

Making tubing by the process of this invention involves extruding the polymeric magnet composition into the form of a tube. The extrusion is typically carried out at a temperature that is within the range of about 100° C. to about 150° C. The extrusion will more typically be carried out at a temperature that is within the range of about 110° C. to about 140° C. This can be done continuously by extruding the rubber composition through an annular die. Generally, an annular flow channel is formed by the outer body of the die and a die mandrel. A wide variety of annular die designs can be utilized. For instance, the mandrel can be supported mechanically onto the outer die body by "spider legs." The disadvantage of utilizing such die designs which include spider legs is that they produce "weld lines" and streaks which are caused by the presence of the spider legs which split the flow of polymer. The weld lines caused by die designs including spider legs are undesirable because they represent points of mechanical weakness in the hose.

It is preferred to use dies wherein the mandrel is mechanically attached to the die body in such a way that obstacles are not presented to the flow of the annular region. The use of such dies eliminates weld lines and the problems associated therewith. Cross-head type dies can be used in such applications. For instance, a side-fed manifold die can be used for extruding the rubber composition into the form of a tube that is later shaped into the desired form of the hose and subsequently cured. The use of such side-fed manifold dies results in the flow of polymer being split at the inlet to the manifold and recombined 180° from the inlet. Due to this design, the polymer flowing around the mandrel has a lower distance to travel than the polymer that does not have to flow all the way around the mandrel. Accordingly, such side-fed manifold dies should be designed in a manner whereby the mandrel is placed eccentrically in the die allowing for a wider gap at the remote end from the lead port to provide a uniform flow rate. Such side-fed manifold dies can be designed in a manner whereby there is an essentially uniform flow rate, but the shear rate and temperature histories of the polymer being extruded will remain nonuniform.

Spiral mandrel dies are highly preferred because they allow for a virtually uniform flow rate, shear rate and temperature history. The use of such spiral mandrel dies also, of course, eliminates the problem of weld lines. The spiral mandrel die distributes the flow of rubber composition into separate feed ports or flow tubes. Each of these ports feeds the rubber composition in a spiral groove cut into the mandrel. The spiral decreases in cross-sectional area, whereas the gap between the mandrel and the die increases toward the exit. This results in a mixing or "layering" of polymer from the various feed ports. The utilization of such spiral mandrel dies results in a very uniform tube and their utilization in practicing this invention is highly preferred. Excellent results can also be attained by utilizing a Monsanto Expanding Pin and Die.

After the tubing has been made by the extrusion process it can be cut or chopped into washers or gaskets that can subsequently be magnetized. The tubing can also be cut to the desired length, magnetized, and then use as solenoid assemblies for automotive door lock motors.

This invention is illustrated by the following examples which are merely for the purpose of illustration and are not to be regarded as limiting the scope of this invention or the manner in which it can be practiced. Unless specifically indicated otherwise, all parts and percentages are given by weight.

EXAMPLE 1

In this experiment, a rubbery polymer suitable for use in the magnet compositions of this invention was synthesized. The polymerization was conducted in a reactor having a capacity of 100 liters. The reactor was equipped with an axially flow turbine agitator which was operated at 110 rpm (revolutions per minute).

The reactor was charged with 74.6 kg (kilograms) of water, 0.92 kg of a half ester maleate soap (made with $C_{16}$ fatty alcohol), 0.31 kg of a 50 percent aqueous potassium hydroxide solution, 0.062 kg of sodium dodecylbenzene sulfonate, 18.0 kg of n-butylacrylate, 2.6 kg of acrylonitrile, 5.1 kg of methylacrylate, 0.38 kg of 1,4-butane diol dimethacrylate, 0.078 kg of t-dodecylmercaptan and 0.058 kg of potassium persulfate. A temperature of about 60° C. was maintained throughout the polymerization. When a total solids content of about 25 percent was achieved, 0.025 kg of additional potassium persulfate was added. This first stage of the polymerization was carried out for a period of about 2½ hours. This first stage polymerization resulted in the production of a seed polymer latex which was used in the second step of the polymerization.

In the second step of the polymerization, 1.47 kg of acrylonitrile, 3.4 kg of styrene, 0.050 kg of divinylbenzene and 0.009 kg of t-dodecylmercaptan were charged into the reactor containing the seed polymer latex. The polymerization proceeded until a solids content of about 30 percent was attained. The latex produced was white in color, had a pH of about 6.5, had a Brookfield viscosity of about 6 centipoise (CPS), a surface tension of about 49 dyne per centimeter and a particle size of about 80 nanometers. However, the latex had a residual acrylonitrile concentration of about 1480 ppm (parts per million), a residual n-butylacrylate concentration of about 325 ppm and had a strong odor. Residual monomer levels were determined by gas chromatography.

The latex made was subsequently coagulated and a dry rubber was recovered. The dry rubber was determined by gas chromatography to contain 24 ppm of residual acrylonitrile and 300 ppm of n-butylacrylate. The dry rubber had an undesirable odor.

The rubbery polymer made was also tested for fogging characteristics. In the procedure used, the condensate from a 10-gram sample maintained at 100° C. was captured for 16 hours on a cooled aluminum foil which was supported on a glass plate. After the 16 hour period, it was determined gravimetrically that about 4 mg of condensate had formed.

EXAMPLE 2

In this experiment, a rubbery polymer was synthesized utilizing a procedure similar to the procedure employed in Example 1. This polymerization was conducted in a reactor having a capacity of 100 liters. The reactor was equipped with an axially flow turbine agitator which was operated at 110 rpm. The reactor was initially charged with 70.92 kg of water, 0.87 kg of dodecanol monomaleate, 0.40 kg of an aqueous 50 percent solution of potassium hydroxide, 0.06 kg of sodium dodecylbenzene sulfonate, 0.06 kg of sodium pyrophosphate, 0.05 kg of triethanol amine, 22.13 kg of n-butyl acrylate, 2.60 kg of acrylonitrile, 1.30 kg of methyl methacrylate, 0.65 kg of 1,4-butanediol dimethacrylate, 0.08 kg of t-docecylmercaptan and 1.56 kg of a 5 percent solution of potassium persulfate. A temperature of about 35° C. was maintained throughout the polymerization. When a total solids content of about 24 percent was achieved, 0.52 kg of additional potassium persulfate solution was added. This first stage of the polymerization was carried out for a period of about 2½ hours. This first stage polymerization resulted in the production of a seed polymer latex which was used in the second step of the polymerization.

In the second step of the polymerization, 1.49 kg of acrylonitrile, 3.47 kg of styrene, 0.050 kg of divinylbenzene and 9.3 mg of t-dodecylmercaptan were charged into the reactor containing the seed polymer latex. The polymerization temperature was then raised to 70° C. and the polymerization was allowed to continue. After the polymerization was completed, the latex made was coagulated and a dry rubber was recovered.

EXAMPLE 3

In this experiment, a rubbery polymer was made in a 2-liter glass reactor. In the procedure employed, 1126 g of water, 5.93 g of a 50 percent aqueous potassium hydroxide solution, 14.0 g of hexadecyl monomaleate, 1.0 g of a 30 percent solution of sodium dodecylbenzene sulfonate, 1.0 g of sodium pyrophosphate, 231 g of n-butyl acrylate, 105 g of acrylonitrile, 42 g of 2-ethylhexylacrylate, 42 g of methyl acrylate, 8.4 g of 1,4-butanediol dimethacrylate, 0.84 g of t-dodecylmethacrylate, 8.3 g of a 5 percent aqueous solution of triethanol amine and 24.9 g of a 5 percent aqueous solution of potassium persulfate were initially charged into the reactor. A temperature of about 35° C. was maintained during the first stage of the polymerization. When a solids content of about 20 percent was reached, the reaction temperature was increased to about 60° C. and 24 g of additional acrylonitrile, 56 g of styrene, 0.96 g of divinylbenzene and 0.16 g of t-dodecylmercaptan were charged into the reactor. After the polymerization was completed, the latex made was coagulated and a rubber was recovered.

EXAMPLE 4

In this experiment, a rubbery polymer was made in a 2-liter glass reactor. In the procedure employed, 1126 g of water, 5.93 g of a 50 percent aqueous potassium hydroxide solution, 14.0 g of hexadecyl monomaleate, 1.0 g of a 30 percent solution of sodium dodecylbenzene sulfonate, 1.0 g of sodium pyrophosphate, 168 g of n-butyl acrylate, 105 g of acrylonitrile, 105 g of 2-ethylhexylacrylate, 42 g of methyl acrylate, 6.3 g of 1,4-butanediol dimethacrylate, 0.44 g of t-dodecylmethacrylate, 8.3 g of a 5 percent aqueous solution of triethanol amine and 24.9 g of a 5 percent aqueous solution of potassium persulfate were initially charged into the reactor. A temperature of about 35° C. was maintained during the first stage of the polymerization. When a solids content of about 20 percent was reached, the reaction temperature was increased to about 60° C. and 24 g of additional acrylonitrile, 56 g of styrene, 0.96 g of divinylbenzene and 0.16 g of t-dodecylmercaptan were charged into the reactor. After the polymerization was completed, the latex made was coagulated and a rubber was recovered.

EXAMPLE 5

In this experiment, the latex made in Example 1 was deodorized before being coagulated. This was accomplished by adding 0.5 weight percent (based upon the total weight of the latex) of ethanolamine to the latex at room temperature (about 22° C.). After one day, the level of residual acrylonitrile dropped from 1480 ppm to 51 ppm and the level of residual n-butylacrylate dropped from 325 ppm to 30 ppm. After three days, the level of residual n-butylacrylate became undetectable.

The deodorized latex was subsequently coagulated and a dry rubber was recovered. Residual levels of acrylonitrile and n-butylacrylate were too low to be detectible by gas chromatography in the dry rubber. The dry rubber recovered did not have an undesirable odor.

EXAMPLE 6

In this experiment, the procedure described in Example 1 was repeated except that the 0.92 kg of half ester maleate soap was replaced with 0.612 kg of an aromatic formaldehyde condensation product soap. The procedure employed in this experiment also differed from the procedure described in Example 1 in that the level of sodium dodecyl benzene sulfonate was increased to 0.3 kg. The aromatic formaldehyde condensation product soap utilized in this experiment was the sodium salt of the condensation product of naphthalene sulfonic acid and formaldehyde. It had a molecular weight that was within the range of about 1000 to about 5000 and can be represented by the structural formula:

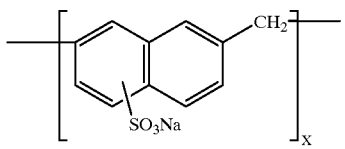

The rubbery polymer made was then tested for fogging characteristics. In the procedure used, the condensate from a 10-gram sample maintained at 100° C. was captured for 16 hours on a cooled aluminum foil which was supported on a glass plate. After the 16 hour period, it was determined gravimetrically that 0.3 mg of condensate had formed. Thus, the fogging characteristics of the rubbery polymer made in this experiment were much better than the fogging characteristics of the rubbery polymer synthesized in Example 1 where 4.0 mg of condensate were collected in the fogging test. In other words, the rubbery polymer made in this experiment generated less than 10 percent of the amount of fog generated with the rubbery polymer of Example 1.

EXAMPLE 7

In this experiment, the procedure described in Example 1 was repeated except that the 0.92 kg of half ester maleate soap was replaced with 0.765 kg of an Sokalan polycarboxylate soap. The procedure employed in this experiment also differed from the procedure described in Example 1 in that the level of sodium dodecyl benzene sulfonate was increased to 0.306 kg.

The rubbery polymer made was then tested for fogging characteristics. In the procedure used, the condensate from a 10-gram sample maintained at 100° C. was captured for 16 hours on a cooled aluminum foil which was supported on a glass plate. After the 16 hour period, it was determined gravimetrically that 0.4 mg of condensate had formed. Thus, the fogging characteristics of the rubbery polymer made in this experiment were much better than the fogging characteristics of the rubbery polymer synthesized in Example 1.

EXAMPLE 8

In this experiment, a magnet composition was made by blending 6 parts of Sunigum rubber, 6 parts of PlioliteS-6B styrene-butadiene resin, 87 parts of strontium ferrite powder, 1 part of low molecular weight polyethylene and 1 part of Ultranox® 815 heat stabilizer. The strontium ferrite powder had a specific gravity of 5.1 and a particle size of 1.5 microns. The low molecular weight polyethylene had a density of 0.91, a softening point of 102° C. and a viscosity at 140° C. of 180 cps. The blend was internally mixed at a temperature of 175° C. at 50 rpm in a Haake Rheocord 90 laboratory size internal mixer for 5–10 minutes. The blend made was determined to have a Shore A hardness of 97, a Shore D hardness of 37, a tensile strength at break of 1608 psi (pounds per square inch), and an elongation at break of 0.5 percent.

The blend was then extruded into tubing having an outside diameter of ⅝ inch and an inside diameter of 2⅜ inch at a temperature of 140° C. The tubing was then cut to various lengths that would be appropriate for use as washers, gaskets, door lock motor solenoid assemblies, or other desired products. A piece of the tubing (2 inches in length) was magnetized by bringing it into contact with a strong magnet from a medical NMR device. The magnetic charge put on the tube was strong enough for the tube to support its own weight by adhering to the bottom side of a metal heating/cooling duct.

While certain representative embodiments and details have been shown for the purpose of illustrating the subject invention, it will be apparent to those skilled in this art that various changes and modifications can be made therein without departing from the scope of the subject invention.

What is claimed is:

1. A process for producing thermoplastic magnetic tubing which comprises extruding a polymeric composition into the said thermoplastic magnetic tubing, wherein said polymeric composition is comprised of (1) from 2 to 8 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of sulfonates and sulfate derivatives, (f) a dispersant selected from the group consisting of aromatic formaldehyde condensation products and polycarboxylates and (g) a crosslinking agent; (2) from 2 to 8 parts by weight of a styrene-butadiene resin; (3) from 80 to 90 parts by weight of a magnetic powder; and (4) from 1 to 8 parts by weight of an internal lubricant; wherein the magnetic composition is extruded through a spiral mandrel die.

2. A process as specified in claim 1 wherein the magnetic powder is selected from the group consisting of iron compounds, nickel compounds, and cobalt compounds.

3. A process as specified in claim 1 wherein the magnetic powder has a particle size which is within the range of about 0.1 microns to about 10 microns.

4. A process as specified in claim 3 wherein the magnetic powder is a metal ferrite.

5. A process as specified in claim 3 wherein the magnetic powder is barium ferrite.

6. A process as specified in claim 3 wherein the magnetic powder is strontium ferrite.

7. A process as specified in claim 1 wherein the extrusion is conducted at a temperature that is within the range of about 110° to about 140° C.

8. A process as specified in claim 1 wherein the magnetic powder has a particle size which is within the range of about 1 microns to about 5 microns.

9. A process for producing thermoplastic magnetic tubing which comprises extruding a polymeric composition into the said thermoplastic magnetic tubing, wherein said polymeric composition is comprised of (1) from 2 to 8 parts by weight of a rubbery polymer which is comprised of repeat units which are comprised of (a) butyl acrylate, (b) at least one member selected from the group consisting of methyl methacrylate, ethyl methacrylate, methyl acrylate and ethyl acrylate, (c) acrylonitrile, (d) styrene, (e) a surfactant selected from the group consisting of aromatic formaldehyde condensation products and polycarboxylates and (g) a crosslinking agent; (2) from 2 to 8 parts by weight of a styrene-butadiene resin; (3) from 80 to 90 parts by weight of a magnetic powder; and (4) from 1 to 8 parts by weight of an internal lubricant; wherein the magnetic composition is extruded through a spiral mandrel die; and wherein the extrusion is conducted at a temperature that is within the range of about 100° to about 150° C.

* * * * *